United States Patent [19]

Dreyer

[11] 4,202,474
[45] May 13, 1980

[54] MACHINE FOR SPREADING FERTILIZER AND SEED

[75] Inventor: Heinz Dreyer, Hasbergen-Gaste, Fed. Rep. of Germany

[73] Assignee: Amazonen-Werke, Hasbergen, Fed. Rep. of Germany

[21] Appl. No.: 753,408

[22] Filed: Dec. 22, 1976

[30] Foreign Application Priority Data

Dec. 31, 1975 [DE] Fed. Rep. of Germany ....... 2559341

[51] Int. Cl.² ............................................ A01B 73/00
[52] U.S. Cl. .................................. 222/609; 222/623; 280/411 A; 280/415 R; 172/248; 172/313; 172/625
[58] Field of Search ............................ 222/609, 623; 280/411 A, 415 R; 172/310, 313, 248, 625

[56] References Cited

U.S. PATENT DOCUMENTS

| 2,736,567 | 2/1956 | McMurray | 172/625 X |
| 2,779,508 | 1/1957 | Ensinger | 222/609 |
| 3,610,661 | 10/1971 | Pierce et al. | 280/411 A X |
| 3,705,560 | 12/1972 | Lappin | 280/415 R |
| 3,738,181 | 6/1973 | Gandrud | 222/609 X |
| 3,884,309 | 5/1975 | Schneider | 172/310 X |

*Primary Examiner*—David A. Scherbel
*Assistant Examiner*—Frederick R. Handren
*Attorney, Agent, or Firm*—Sprung, Felfe, Horn, Lynch & Kramer

[57] ABSTRACT

A machine for spreading fertilizer and seed in which the width of the machine with respect to its working direction of travel is greater than its length with respect to the working direction of travel. The machine comprises at least two individual machine units having lateral and transverse sides which units are assembled together in a lateral relationship to each other by means of laterally located hitch elements on each unit. Each unit has a chassis borne at three support points by swivel wheels and is provided with additional hitch elements on the transverse side towards the working direction. On each unit at least one swivel wheel is lockable in both a working direction of travel and in a transport direction of travel which directions are at right angles to each other. When assembled together through paired hitch elements, the machine units are pivotable with respect to each other about a pivot axis parallel to the working direction, and also pivotable about a second pivot axis running transversely to the working direction of travel. One of the swivel wheels on each unit when locked in the working direction is utilized to provide a rotating motion to metering means for the dispensing of fertilizer and seed from each machine unit.

10 Claims, 4 Drawing Figures

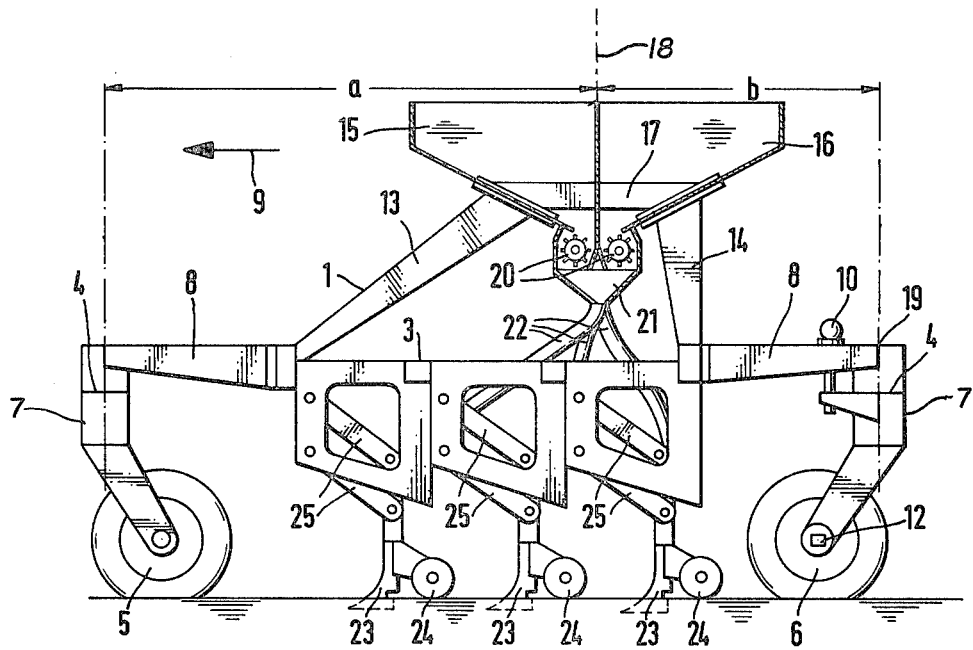
FIG. 1
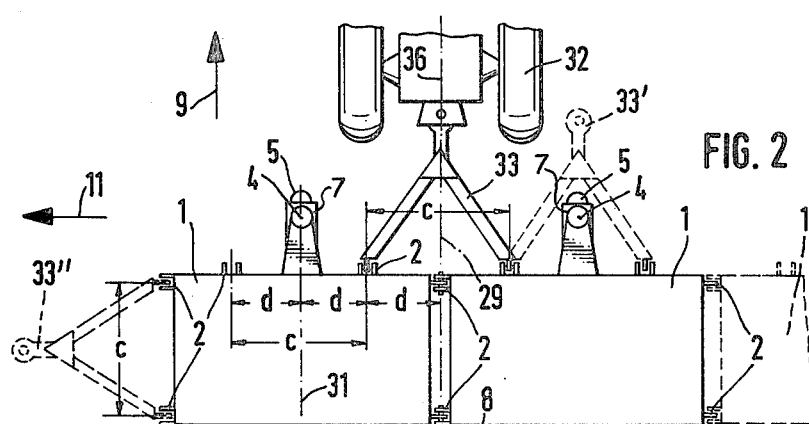
FIG. 2
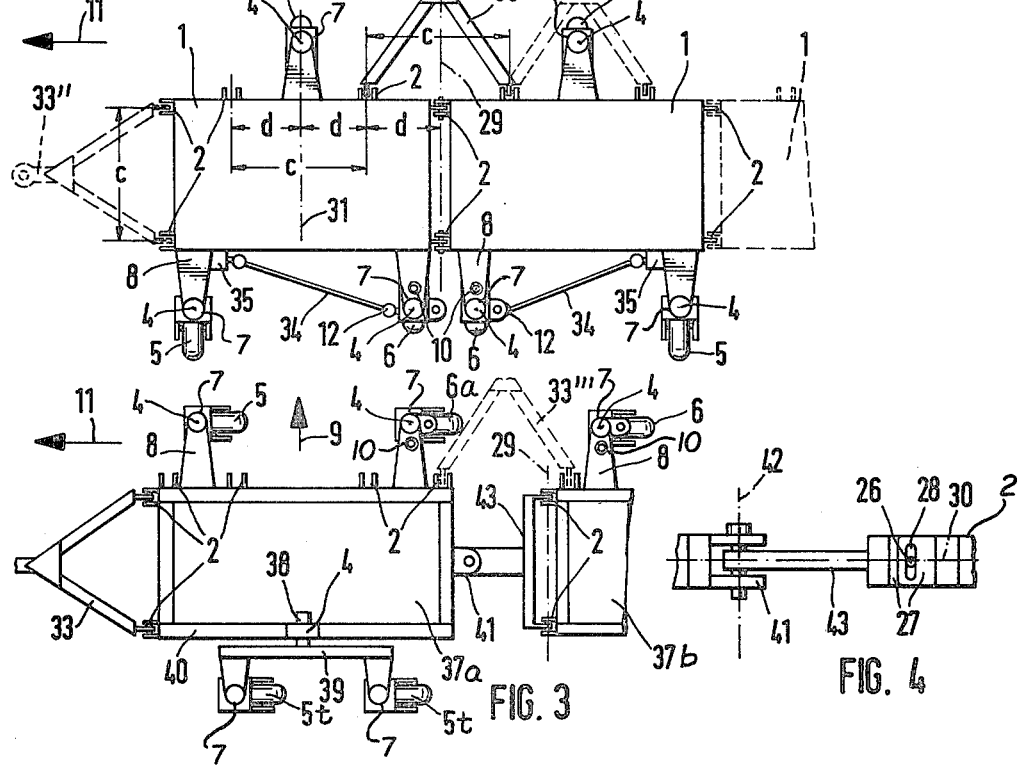
FIG. 3
FIG. 4

MACHINE FOR SPREADING FERTILIZER AND SEED

BACKGROUND OF THE INVENTION

The present invention relates to a machine for the spreading of fertilizers and seeds, in which, as viewed from the working direction, the structural width is greater than the structural length, and which can be assembled from at least two machine units, each of which is equipped with hoppers. Each of such machine units has a chassis borne at three support points by swivel wheels. Also, on the front transverse side in the working direction additional hitch elements are provided for hitching the machine units to a tractor for operation in the field, and in which the support points are at a relatively great distance apart. At least one wheel is in the form of a swivel wheel which can rotate 360° about a vertical swivel axis.

A machine of this kind is disclosed in U.S. Pat. No. 3,884,309. This machine has the disadvantage that adjusting it between travel in the working direction and in the transport direction is extraordinarily difficult and time-consuming. This is because not just the swivel wheel but the other two wheels of each machine unit have to be locked in the working direction and in the transport direction, it being necessary, for the purpose of changing over from the one direction to the other, to use screw jacks to move the mounts of the wheels completely out of the mount guides. The machine in this case loses its stance, so that it would collapse if the machine units were not supported by other aids. Besides free space must be provided under the orientatable wheels, or else the changeover of the lockable wheels must be performed after the chassis has been removed.

A further disadvantage is that the machine cannot be supported uniformly on all wheels when assembled from the machine units, since the laterally disposed hitch elements of square cross section engage one another only in a telescoping manner. They do not permit any movement of the individual units in relation to one another. Particularly on the wavy ground surface so often encountered in practice, not to speak of even greater irregularities in the terrain, the entire weight of the machine is supported on the ground by only a few of the wheels at a time. This makes permanent twisting of the chassis unavoidable or even breakage in the long run. On this account, too, the uniform spreading of the material in the hoppers is impossible if the metering means of the machine units are driven by a wheel, since this wheel from time to time will be operating under insufficient loading, or may even be entirely suspended above the ground.

Furthermore, when the machine is hauled for long distances over the road, there is the disadvantage that on each machine unit two wheels located at a relatively great distance apart are locked. Consequently, on curves these wheels will scrape on the road surface. In addition to excessive tire wear, this can cause distortions or even breakage of the mounts of the locked up wheels if the roads and lanes are in poor condition.

A prospectus of the Versatile Company of Winnipeg-Manitoba, Canada discloses a chassis for a great number of harrow units, in which the above described disadvantages are overcome by constructing all eight road wheels as swivel wheels, three swivel wheels being able to be locked both in the working direction, and in the transport direction which is at right angles thereto. For the changeover for travel in the working direction, or for travel in the transport direction, only the one towbar needs to be attached to the tractor, the other towbar being raised to its transport position, and two swivel wheels situated one beside the other transversely to the direction of the travel need to be locked in position. To prevent any of the swivel wheels from becoming unloaded or from losing contact with the generally uneven ground surface thereby accordingly increasing the pressure on the other wheels, the frame of the unit is of torsionally flexible construction. Also, the harrow units, which in themselves are rigid, are attached to the chassis by chains. For the application for which the chassis is especially designed, that is, as a transportable chassis for harrow units, such a design is certainly advantageous. Nevertheless, this chassis is completely unsuited for the mounting of fertilizer spreaders and seeders, since the hoppers, the metering means and the broadcasters as well as the means whereby they are driven either cannot be constructed or disposed at all or only to a certain extent in a torsionally flexible manner.

SUMMARY OF THE INVENTION

This invention is concerned with the problem of improving the known machines to achieve a simple and convenient method of setting them up for travel in the working direction and in the transport direction, as well as reliable operation of the machines in both directions of travel.

In accordance with the present invention, all of the wheels are constructed as swivel wheels in a known manner and at least one swivel wheel is lockable both in the working direction and in the transport direction which are at right angles to each other. On each machine unit, the hitch elements, when coupled to one another in pairs, are pivotable about a pivot axis extending in the working direction and further about a pivot axis extending transversely of the working direction. As a result of these measures, the machine can be set up just as simply and rapidly as the Canadian machine for travel in the working or in the transport direction, but furthermore, in spite of the rigid construction of the machine units, which is necessary for the operation of the machine, the three-point supporting of the machine units to enable them to adapt to all conditions of the terrain is achieved. A flexible adaptation of the entire machine to uneven ground surfaces both in the working direction and in the transport is also made possible. These advantages are also retained when the machine is coupled by means of its front hitch elements directly to the three-point power lift of a tractor, or when, independently of the power life, the machine units are equipped, as in the case of the known machine, with tools penetrating the soil or rolling thereon, in which case none of the swivel wheels must, or needs to, be locked.

In an advantageous development of the idea of the invention, the hitch elements have links which can be joined together by bolts, in which links elongated holes extending in the vertical plane are disposed. These measures permit a substantial simplification of the design.

In this case, furthermore, hitch elements disposed on the forward side of the machine units in the direction of travel are disposed at the same interval on either side of the longitudinal central axis of each machine unit. The same interval is also provided from the forward hitch elements located on each side of this longitudinal central axis to the pivot axis of the lateral hitch elements which on the same side and extending in the working direction. This interval is half as great as the interval between the hitch elements located on the forward side and the lateral sides.

In this manner an additional important simplification of design is achieved, since regardless of the number of machine units of which the machine is composed, it is possible to use only one tow bar for towing the machine in either the working direction or the transport direction.

The interval between the centerline drawn transversely of the working direction and the one point of support located on one transverse side is approximately twice as great as the interval between the centerline and the straignt line drawn between the two support points located on the other transverse side, to achieve a sufficiently equal loading for all of the swivel wheels. This approximately equal loading has an especially favorable effect with regard to smooth and vibration-free movement even over bumpy terrain. Furthermore, the same tires adapted to the possible maximum loading can be selected for all of the swivel wheels.

The smooth movement of the machine over bumpy terrain is still further improved by an embodiment wherein, on the side of a machine unit on which a single support point is located on the side at this point of support has a horizontal shaft extending towards the central part of the machine unit, on which a truck is mounted to the chassis for rotation at its center. An equal number of swivel wheels are located on the truck at the same distances from the horizontal shaft. The shaft can be disposed either on one transverse side and extend in the working direction, or it can be disposed on a longitudinal side of the machine unit, in which case it will then extend transversely of the working direction.

In a preferred embodiment, the invention furthermore provides that on each machine unit there is a swivel wheel which can be locked in its running direction and which has a stub shaft for the transmission of its rotation to the metering elements of the machine units. This makes it possible for the metering elements of the machine to be powered without having to provide an additional pivoting wheel for that purpose.

In this embodiment, if the swivel wheel equipped with the stub shaft is disposed on the rear side of the chassis in the direction parallel to the working direction, and locked in a position ahead of its swivel axis, it receives a stronger loading on each machine unit, resulting in less slippage of this wheel.

Also, one swivel wheel on each machine unit can be equipped with a driving means whose stub shaft is formed by the wheel axle, in which case the driving of the metering elements can advantageously be taken from this swivel wheel even if none of the swivel wheels can be or needs to be locked when in use.

BRIEF DESCRIPTION OF THE DRAWING

The invention will be explained in greater detail below with reference to the accompanying drawing which forms a part of the specification, wherein:

FIG. 1 is a side plan view partly in cross-section of one machine unit of the machine of the invention;

FIG. 2 is a top plan view on a reduced scale of the machine composed of the same units with some details such as hoppers not shown;

FIG. 3 is a top plan view of a machine in accordance with the invention which is assembled from units of different design; and FIG. 4 is a side elevational view of the hitch elements of the machine represented in FIG. 3, the right hand side of which also illustrates hitch elements of FIGS. 1 and 2.

DESCRIPTION OF ILLUSTRATIVE EMBODIMENTS

The machine shown in FIGS. 1 and 2 consists of the individual machine units 1, which are assembled together by means of the coupling elements 2. Each machine unit 1 is equipped with a chassis 3 which is supported at three support points 4 by three swivel wheels 5 and 6. The swivel shafts 7 of the swivel wheels 5 and 6, which pass through the support points 4 are disposed on mounts 8 which are removably fastened to the chassis 3 by conventional fastening means not illustrated. This type of construction permits a simple disassembly of the projecting swivel wheels 5 and 6 together with their mounts 8 when the machine unit 1 is to occupy a minimum of space, for shipment by boat, for example.

As best seen in FIG. 2, one swivel wheel 5 is situated on the forward side of the chassis 3 of each individual machine unit 1, i.e., the side facing in the direction of operation as indicated by the arrow 9, while the other two swivel wheels 5 and 6 are disposed on the rearward side of the chassis 3. While the swivel wheels 5 are able to turn freely about their swivel shafts 7 and thus adapt automatically to any direction of travel, the swivel wheel 6 on each machine unit 1 can be locked by means of the pin 10 either in the direction of operation shown by arrow 9 or in the transport direction shown by arrow 11 at right angles thereto. The swivel wheel 6 is equipped with a stub shaft 12 or driving means. When swivel wheel 6 is locked in the working direction 9, it is situated forward of its swivel shaft 7.

On the chassis 3 of each machine unit 1, the hoppers 15 and 16 are assembled to form a single unit, and are removably mounted by means of the supports 13 and 14. The forward supports 13 extend from the forward side of chassis 3, and the rear supports 14 extend from the rearward side of chassis 3, to the hoppers 15 and 16, and are bolted in pairs to a compression brace 17 passing through the hoppers 15 and 16. In this manner, an especially strong construction of the chassis 3 is achieved. Furthermore, the hoppers 15 and 16 can be dismounted in a simple manner if the machine is to be assembled to minimize its bulk for shipment from the manufacturer's plant. Furthermore, the hoppers 15 and 16 are disposed on the chassis 3 in such a manner that the distance a between the centerline 18 (FIG. 1) drawn through the hoppers transversely of the working direction 9 and the forward support point 4 is approximately twice as great as the distance b between the centerline 18 and the rearward support points 4. These details are not shown in FIG. 2 for the sake of simplicity and, in turn, clarity.

The materials (not shown) streaming from the hoppers 15 and 16, of which the front hopper 15 is generally intended for fertilizers and the rear hopper 16 for seeds, are fed by the metering means in the form of lugged wheels 20 in controllable amounts to the trough 21. From this trough 21 they flow together through the hoses 22 connected to this trough 21 to the furrow openers 23 which are disposed offset from one another, and from which they drop into the furrows opened in the soil by the furrow openers 23. The furrow openers 23, each of which is equipped with a furrow closing roller 24, are disposed on the parallelogram hangers 25, and thus they can be adjusted for their depth of penetration into the soil and raised from the ground for overtheroad travel in a conventional manner which is not illustrated.

As seen on the right side of FIG. 4, the hitch elements 2 have links 27 which can be joined to one another by means of bolts 26, the bolts 26 being inserted through the vertical elongated holes 28 in the links 27. By this construction, the hitch elements 2, and thus the individual machine units 1 can be swung on one another, when in the coupled state, not only about the pivot axis 29 parallel to the working direction, but also about the pivot axis 30 extending transversely of the working direction 9.

Further, as seen in FIG. 2, the hitch elements 2 are disposed at the same distance apart, c, both on the forward side of the machine units 1 and on the sides parallel to the working direction 9. Furthermore, the hitch elements 2 disposed on the forward side are at the same distance d on either side of the center longitudinal axis 31 drawn parallel to the working direction 9 through each machine unit 1. This distance d is half as great as the distance c between the hitch elements 2 disposed on each side of the axis 31. Lastly, the distance d is provided also between the pivot axis 29 and the hitch elements 2 located on this front side, so that the spacing c is automatically provided between the adjacent hitch elements 2 of two coupled machine units 1.

As a result of this arrangement of the hitch elements 2, a single draw device tow bar 33 can be used both for travel in the working direction 9 and for travel in the transport direction 11, regardless of whether the assembled machine consists of one, two, three or even more machine units 1. For clarification, the positions utilized for this purpose are illustrated in FIG. 2. The representation of the tow bar in solid lines at 33 indicates the coupling to the tractor 32 of a machine composed of an even whole number of machine units 1 for travel in the working direction 9. If the number of machine units 1 of which the machine is composed is an odd whole number, the tow bar is attached to the hitch elements 2 in the position 33' represented by the broken lines. For transport, however, the tow bar is placed in position 33" regardless of the number of machine units 1, i.e., it is attached to the hitch elements 2 located on one longitudinal side of a machine unit 1.

The driving of the metering devices 20 of each individual machine unit 1 is accomplished by means of the swivel wheel 6 through its stub shaft 12, the universal shaft 34, and the controlling transmission 35, which is not shown in detail. The swivel wheel 6 is locked in its working position. By means of the controlling transmission 35, the rotatory speed of the lugged wheel metering devices 20, and hence, the particular rate of output can be adapted to the requirements of the particular case.

As shown in FIG. 2, the lockable swivel wheel 6 equipped with the stub shaft 12 is located on each machine unit 1 on the side thereof which is closest to the longitudinal centerline 36 which is drawn through the tractor 32 in the working direction 9. In this arrangement, the line 36 coincides with the pivot axis 29.

This arrangement is made in consideration of the fact that, in operation, at least approximately the same rotatory speed is transmitted by the locked swivel wheels 6 to the lugged wheel metering elements 20 whether the machine is running straight or around curves.

For transport over the road, the universal shafts 34 must be uncoupled from the stub shafts 12 and secured in a known manner to the machine unit 1. Furthermore, for this purpose the locking pins 10 must be withdrawn from the mounts 8 of the swivel wheels 6. One of these swivel wheels 6 must be locked in the transport direction 11 by insertion of a locking pin 10 to lock the swivel wheel 6 in direction 11.

The invention also covers an embodiment which is not represented, in which all of the swivel wheels 5 and 6 are constructed like locking swivel wheels 6. When the machine is operated in the working direction 9, all of the swivel wheels 5 and 6 disposed on the rear sides of the machine units 1 can then be locked for better lateral stability on slopes, whereas for transport in the direction 11, only one swivel wheel 6 on the forward transverse side and one on the rear transverse side on only one machine unit will have to be locked.

The machine shown in FIG. 3 is set up for travel in the transport direction 11 and consists of the two coupled machine units 37a and 37b which are substantially of the same construction as the machine units 1 and for this reason are not shown in detail. The difference between this embodiment and the one shown in FIGS. 1 and 2 consists, first in the fact that two support points 4 with swivel wheels 5a and 6a are disposed on the forward transverse side in the working direction 9, the rear swivel wheel 6a is lockable on the leading machine unit, and the front swivel wheel 6b being lockable on the trailing machine unit 37b.

Furthermore, the support point 4 on the side that is in the rear in the working direction 9 on both machine units 37a and 37b has a shaft 38 on which the truck 39 is rotatably disposed on the chassis 40 of machine units 37a and 37b. Two swivel wheels 5t are disposed on this truck 39 at equal distances from the shaft 38. The spacing between the swivel wheels 5t in this case can be altered in a known manner which is not illustrated. This measure is important in that at least two of the swivel wheels 5t disposed on the trucks 39 are able to roll in the wheel track of the tractor 32 pulling the machine, regardless of the number of machine units comprised in the machine.

An additional difference between this embodiment and the machine of FIGS. 1 and 2 is that, in each case, one hitch element 41 is provided on the side that is rearward in the direction of transport 11, and includes a conventional vertical pin and hole arrangement defining pivot axis 42. The coupling to the machine unit 37b that is behind 37a in the direction of transport 11 is accomplished by means of a tow bar 43 which is joined to the hitch elements 2 located on the forward side of this machine unit 37b. In this manner, a swinging of the machine units 37a and 37b about the three axes 29, 30 and 42 which cross one another at right angles is made possible. It is also possible to tow over the road, like so many two-axle trailers, the machine units 37a and 37b coupled together in tandem in the direction of transport 11 and hitched to the tractor which is not represented in the drawing. In this case, it is necessary only to lock the swivel wheels 6a and 6b in the transport position.

Lastly, additional hitch elements 2 are disposed at both ends of the front transverse side in the working direction 9, to which the tow bar 33 can be attached in the position 33''', which is represented in broken lines, so that the machine units will be prevented from slewing on one another about the vertical pivot axis 42.

While the invention has been explained by a detailed description of certain specific embodiments, it is understood that various modifications and substitutions can be made in any of them within the scope of the appended claims which are intended also to include equivalents of such embodiments.

What is claimed is:

1. A machine for spreading fertilizer and seed movable in a working direction for said spreading and in a transport direction which is at right angles to the working direction, wherein the width of said machine with respect to its working direction of travel is greater than its length with respect thereto, said machine comprising at least two individual machine units having lateral and transverse sides and assembled together in lateral relationship to each other by laterally located and extending hitch elements on each of said machine units, each of said machine units having a chassis borne at three support points disposed in a triangular array by wheels during movement in the working direction and movement in the transport direction, additional hitch elements on the transverse side towards the working direction of each machine unit, said additional hitch elements being spaced a distance c from each other on the front transverse side of each machine unit and the laterally located hitch elements on each of the machine units being spaced the distance c from each other, said wheels each being a swivally mounted wheel swivable about a vertical axis, at least one said swivel wheel on each machine unit being lockable in the working direction and in the transport direction, said assembled together machine units being pivotable with respect to each other about a pivot axis parallel to the working direction by means of said hitch elements on the lateral sides of said machine units, and being pivotable about a second pivot axis running horizontally and transversely to said working direction.

2. A machine as claimed in claim 1 wherein each of said laterally located hitch elements comprises two links having vertically oriented slots therein, and a link interposed between said two links and having a bolt which passes through said slots.

3. A machine as claimed in claim 1 wherein said hitch elements on said front transverse side of said machine units are further disposed at intervals equal to c/2 on either side of the central longitudinal axis of each machine unit and also on either side of the pivot axis of the machine which is parallel to the working direction.

4. A machine as claimed in claim 1 wherein on one lateral side of each machine unit parallel to the working direction a hitch element is provided which has a vertical pivot axis.

5. A machine as claimed in claim 1 wherein each machine unit comprises a hopper, one of said support points being on one transverse side of the machine unit, and two being on the other transverse side, the distance (a) from the centerline (18) drawn transversely of the working direction through each hopper to said one support point being approximately twice as great as the distance (b) from the centerline (18) to a straight connecting line drawn between said two support points, whereby said hoppers are located on said chassis in a manner such that the weight of said unit is borne substantially equally by each support point.

6. A machine as claimed in claim 1 wherein on one transverse side of each said machine unit a horizontal shaft extends from a support point to pivotally support a truck at its central portion, said truck having swivel wheels located equidistant on said truck from said shaft.

7. A machine as claimed in claim 6 wherein the distance of the swivel wheels on the end of said truck from one another is adjustable.

8. A machine as claimed in claim 1 wherein said lockable swivel wheel has a driving means for transmitting rotation of the wheel to metering means for dispensing the fertilizer and seed from each said machine unit, said driving means being a stub shaft formed by said lockable swivel wheel axle.

9. A machine as claimed in claim 8 wherein said lockable swivel wheel is located on the rear transverse side of the chassis with respect to the working direction and ahead of its swivel axis when locked in the working direction.

10. Machine of claim 8, characterized in that the swivel wheel equipped with the driving means is located on each machine unit on the side which is closest to the centerline drawn in the working direction through the tractor pulling the machine.

* * * * *